United States Patent [19]

Cope

[11] Patent Number: 4,638,022

[45] Date of Patent: Jan. 20, 1987

[54] MOLDING COATING COMPOSITION AND PROCESS

[75] Inventor: Carroll W. Cope, Marion, Va.

[73] Assignee: DG Shelter Products, Marion, Va.

[21] Appl. No.: 843,203

[22] Filed: Mar. 24, 1986

[51] Int. Cl.$^4$ ............................................. C08K 11/00
[52] U.S. Cl. ..................................................... 524/15
[58] Field of Search ........................................... 524/15

[56] References Cited

U.S. PATENT DOCUMENTS 2,767,150  10/1956  Harvey ................................. 524/15

Primary Examiner—Paul R. Michl
Attorney, Agent, or Firm—Flehr, Hohbach, Test, Albritton & Herbert

[57] ABSTRACT

Compositions and methods are provided for forming a coated wood product having the appearance and texture of wood grain, which conceals joints on the wood surface and which is capable of accepting conventional wood stain.

3 Claims, No Drawings

MOLDING COATING COMPOSITION AND PROCESS

The present invention is directed to a method and compositions used therewith for coating wood or plastic to render it capable of receiving wood-grain printing inks and conventional wood stains, while also concealing joints and other imperfections.

In the decorative uses of wood, there are many applications in which visible joints in the wood are not desired. For example, in the use of moldings along the edges of doors, window frames, door frames, and the like, it is desirable to have each edge constructed of a single length of wood. Moreover, to have a decorative effect, the wood is often stained to a desired color, such as walnut, rosewood, and the like, then covered with a protective coating such as varnish or other conventional clear coating. The use of single lengths of wood is expensive and wasteful, since short lengths of scrap wood are not reusable. There is no practical alternative to using single lengths of wood for moldings. Plastics or compounded wood pulp products are usually not desirable since they either do not have sufficient strength and durability or do not have the pleasing wood grain surface texture. A piece of plywood would also be extremely expensive since one or more surfaces of the molding would have to be veneered, making it much more expensive than a solid piece of wood.

The use of scrap pieces of wood joined together, such as by finger joints, would be desirable. However, heretofore such joined pieces have not had the appearance, nor have been capable of being treated to have the appearance, of a single piece of wood for decorative uses. Of course, if the joined pieces of wood are to be pained with an opaque color, then the use of joined pieces does not matter. However, in most cases, the wood appearance and texture need to be maintained. This gives rise to the heretofore unsolved problem of, on the one hand, having to conceal the joint, but on the other hand, having to maintain the appearance and texture of a single piece of wood. Methods of application of coatings to a joined piece of wood known in the prior art, while concealing the joint, also destroy the wood grain texture. Thus, even if a pattern of wood grain could be printed onto the coating, the "grainy" appearance of the wood would be covered by the coating. Also, the versatility of such a coated piece of wood is reduced since the color of the wood remains that of the color of the coating with the printed wood grain pattern because the coating and printed pattern would not satisfactorily accept a stain. Thus, different coatings would have to be made to simulate different colors of wood such as pine, oak, walnut, rosewood, and the like. Not only would this be expensive, but it also introduces the problem of nonuniformity from batch to batch. In housing construction, it is desirable that all the wood trim have the same appearance. Therefore, it would be desirable to have a coating which would also accept conventional wood stains.

The process and compositions according to the present invention are useful for coating plastic or joined pieces of wood without the above problems.

It is, therefore, an object of the present invention to provide compositions which are useful for coating wood to conceal joints, but which retain the grainy texture of the natural wood.

It is a further object of the present invention to provide novel coatings for wood or plastic which accept conventional wood stains.

These and other objects will be apparent from the following description and preferred embodiments.

The present invention is directed to compositions for coating wood and plastic surfaces and methods of use therefore. In particular, three compositions are provided for coating surfaces, the first being useful for coating wood or plastic surfaces, the second being useful for plastic surfaces, and the third being useful for wood or plastic surfaces exposed to the outdoors.

The compositions according to the present invention comprise resins, drying oils or lacquers, and solvents, diluents, thinners, driers, ultraviolet light absorbers, fire retardants, and the like, and nutshell flour. The third composition, useful for exterior surfaces, additionally comprises inorganic pigments. These compositions are used to form coated products which have the appearance and texture of natural wood, yet conceal joints and are capable of accepting conventional wood stains.

The starting material for forming a wood product according to the present invention may be any product having a plastic or wood surface, including strips, with or without joints, sheets, including plywood and wood grained paper, or any other product derived from wood or wood pulp, sawdust and the like. Since a primary purpose for use of the compositions according to the present invention is to provide a decorative surface, it is desirable, but not necessary, that the starting material have a wood grained texture, since that texture will be substantially retained after the coating is applied according to the present invention.

Generally, the product to be treated will be coated by a liquid composition basecoat according to the present invention then dried to remove volatile solvents. The drying is preferably performed with heat in a conventional oven, but other evaporative methods may be utilized. Then a grain ink formulation may be applied in a pattern to simulate wood grain using a conventional roller having a wood grain pattern using inks as described, for example, in Pat. No. 4,546,133. Apparatus for performing these functions are conventional and known in the art.

One basecoat formulation according to the present invention, useful for coating wood or plastic, comprises the following components:
  acrylic resins (such as, Joncryl 89 ®)
  acrylic emulsions (such as, Rhoplex AC-507 ®)
  inert talc pigment (such as, Asbestine 325 ®)
  water-dispersing resin (such as, SMA 1440-H Resin)
  water-miscible thickener (such as, Cellosize ®QP-09-H) dimethyl ethanol
  wetting agent (such as, Surfynol ®TG)
  inert priming pigments (such as, Ti-Pure R-900 ® and Hitox ®)
  inert pigment (such as, Minusil 10 ®)
  defoamer (such as, Colloid 711)
  fungicide (such as, Super-Adit ®)
  coalescer (such as, Carbitol ®)
  defoamer for water-miscible components (such as, Defoamer ®6-475)
  pecan shell flour
  water A particularly preferred basecoat composition useful for coating wood or plastic proportionally contains the following:

Gallons 24.875 Water
0.179 Cellosize QP-09-H
0.187 Dimethyl Ethanol
0.227 Defoamer 6-475
0.837 SMA 1440-H Resin
0.847 Surfynol TG
0.789 Ti-Pure R-900
2.171 Hitox
3.393 Minusil 10
10.464 Asbestine 325
0.194 Colloid 711
0.129 Super-Adit
1.629 Carbitol
41.333 Rhoplex AC-507
12.748 Joncryl 89
2.326 Pecan Shell Flour The resins recited above include synthetic resins such as alkyd rsins; polyester resins, including water extended polyesters, polystyrene, vinyl resins including polyvinyl acetate, polyvinyl chloride, vinyl chloride-vinyl acetate copolymers, etc.; polyamide resins, polyurea resins, acrylic resins; phenolic resins; maleic resins, coumaroneindene resins; urea-formaldehyde resins; melamine-formaldehyde resins; epoxy resins including water emulsifiable epoxy reins; silicone reins; ionomer resins; acetal resins, polyethylene; polypropylene, hydrocarbon resins; rubber derivatives, such as chlorinated rubber; polycarbonate resins; phenoxy resins, fluoroplastics; styrene-butadiene resins; polyurethane resins; furane resins; polysulfone resins; pentacrythritol resins; ester gum, copal ester; and the like. Natural resins which may be used include shellac, rosin copal resins, dammar resins, manilla resins, etc. Lacquers such as those formed form nitrocellulose, cellulose acetate, cellulose acetate-butyrate, ethyl cellulose, etc. may be used. Drying oils which may be used include those commonly used in paints and varnishes, such as linseed oil, soybean oil, tung oil, dehydrated castor oil, perilla oil, oiticica oil, fish oil, safflower oil, and the like.

Typical solvents and thinners include turpentine, dipentine, pine oil, petroleum spirits, naphtha, mineral spirits, ethyl and methyl alcohol, toluol, benzol, xylol, acetone, ethyl acetate, amyl acetate, etc. Typical driers include cobalt driers, lead driers, manganese driers, calcium driers, iron driers, zinc driers, etc., all of which are well known to the trade. The several portions of vehicle used in preparing any one decorative coating are generally composed of the same basic materials although they may have varying amounts of thinners, solvents, fillers, etc., so as to vary their viscosities and other physical properties, but there may be a combination of unrelated resins used on the same panel to provide texture and growth lines.

The basecoat composition will also contain inorganic minerals an salts, which are believed to be primarily for forming the texture of the basecoat. Such minerals may be selected from silica ($SiO_2$), titanium dioxide, calcium carbonate, talc and the like. Preferably, mixtures of silica, titanium dioxide, calcium carbonate and talc will be used in various amounts depending upon the type of wood to which the basecoat is to be applied and the method of applying the basecoat. Particularly, it will be within the skill of those of ordinary skill in the art to adjust the amount of minerals and mineral salts to achieve the desired texture and effect.

Another component of the basecoat will be pulverized nutshell, preferably in the form of a fine powder. Typical grain size of the powder will be 42 to 46 microns. Preferably, pecan shell flour will be used. While not intending to be bound by a particular theory, it is believed that the pecan shell flour is critical in that it provides a natural substance as an ingredient of the basecoat, which possibly assists in the acceptance of the basecoat of natural stains.

Further components of the basecoat are a natural vegetable oil and alkyd resin. The vegetable oils may be derivatized in the form of alkyds, which are polyesters formed by esterifying the acid and/or alcohol portions of the components of the natural vegetable oil. Such alkyds derived from natural oils are commercially available, such as Reichhold ®P-222. Preferably, the basecoat will contain both a natural oil, such as soybean oil, and a natural oil alkyd, such as alkyd of coconut.

The remainder of the basecoat comprises volatile solvents and esters, of a kind and in an amount sufficient to dissolve and/or suspend the various components into a uniform liquid suspension. It is desirable that the solvents comprise some polar solvents, such as methanol and butanol, nonpolar aromatic solvents, such as toluene and xylene, and slightly polar solvents, such as ketones, including acetone methyl ethyl ketone and the like. Other higher molecular weight solvents may also be utilized, such as petroleum distillates, in particular lactol spirits, which are commercially available; esters, such as isobutyl isobutyrate, isobutyl acetate, and the like, which assist in dissolving or suspending the resins.

Finally, the basecoat composition may contain other conventional additives such as suspending agents (such as Bentone ®), dispersing agents (such as polyethylene), antifoaming agents (such as silicone), and air-releasing agents (such as silicone). These agents are to assist in the uniform dispersion of the components within the composition and to provide a uniform, smooth coating once applied to the wood surface.

The particular proportions of the various components used may be generally in the proportions given above. It will be understood, however, that various modifications in proportions and components may be utilized without departing from the scope of the present invention.

A second composition according to the present invention, usable on plastic surfaces, comprises the following components:
a white vinyl basecoat resin formulation (such as, DG White Vinyl Basecoat)
a yellow vinyl basecoat resin formulation (such as, DG Yellow Vinyl Basecoat)
pecan shell flour
flat sealer (such as, DG Flat Sealer)

A particularly preferred basecoat useful for coating plastic surfaces proportionally contains the following:

Gallons 2.326 gal. Pecan Shell Flour (in 6.0 gal. DG Flat Sealer ™)
56.510 gal. DG Flat Sealer ™
31.250 gal. DG White Vinyl Basecoat ™
3.910 gal. DG Yellow Vinyl Basecoat ™

The above-identified DG Vinyl White Basecoat ™ formulation comprises the following:
Toluol—4.01 gals.
Resimere ®—8.002 gals.—(Resin imparting flexibility and adhesion)

Nuo-sperse ®—0.875 gals.—(Wetting agent)
Lactimor ®—0.25 gals.—(Wetting agent)
M.P.A.-2000X ®—0.48 gals.—(Anti-settling agent)
Ty-Pure ®R-900—230.069 lbs.—(White pigment)
Methyl Ethyl Ketone—25.008 gals.
Acetone—15.805 gals.
Lactol—24.213 gals.
V.A.G.H. ®Vinyl—74.022 lbs.—(Resin)
C.A.B.—54.016 lbs.—(Resin)
D.O.P.—3.001 gals.—(Plasticizer)
O.K. 412—Trace—(Inert flatting pigment)

The above-identified DG Vinyl Yellow Basecoat TM formulation comprises the following:
Toluol—4.01 gals.
Resimere ®—8.002 gals.
Nuo-Sperse ®—0.875 gals.—(Wetting agent)
Lactimor ®—0.25 gals.—(Wetting agent)
M.P.A. 2000X ®—0.48 gals.—(Anti-settling agent)
Y.O.P.—210.00 lbs.—(Yellow pigment)
M.E.K.—25.008 gals.
Acetone—15.805 gals.
Lactol—24.213 gals.—(Solvent)
V.A.G.H. ®Vinyl—74.022 lbs.—(Resin)
C.A.B.—54.016 lbs.—(Resin)
D.O.P.—3.001 gals.—(Plasticizer)
O.K. 412—Adjust—(Flatting pigment)

The above-identified DG Flat Sealer TM formulation comprises the following:
Toluol—20.320 gals.
Methyl Amyl Ketone—7.007 gals.
Methyl Isobutyl Ketone—10.010 gals.
Vinylite V.A.G.H. ®—11.630 lbs.—(Resin)
Syloid 74-X3500 ®—1.682 lbs.—(Flatting agent)
Methyl Ethyl Ketone—20.020 gals.
Acetone—10.611 gals.
Resimere ®955—10.711 gals.—(Resin)
Paraplex ®—2.503 gals.—(Plasticizer)
Propylene Oxide—0.301 gals.—(Plasticizer solvent)
Dislon ®4200-10—5.005 gals. (Anti-settling agent)

A third composition according to the present invention, usable on plastic and wood exterior surfaces, comprises the following components:
 acrylic resin (such as, Acryloid B-66 (100%))
 plasticizer (such as, Santicizer 160)
 solvent (such as, industrial toluol)
 fast drying solvent (such as, Isobutyl acetate)
 thickener (such as, High Vis. CV)
 flexibility agent (such as, Cab-381-0.1)
 prime pigment (such as, Ti Pure R-902)
 anti-settling agent (such as, MPA-60 Toluene)
 inert pigment (such as, Burgess #10 Pigment)
 inert pigment (such as, Minusil 10)
 fast drying solvent (such as, Isobutyl Acetate)
 alcohol solvent (such as, N-Butyl)
 alcohol solvent (such as, Isopropanol, 99% UPA)
 extender solvent (such as, Lacquer Diluent)
 fungicide (such as, Super-Adit)
 flatting agent (such as, Flatting Agent-OK-412)
 prime color pigment (such as, 6328A Iron Oxide Yellow)
 prime color pigment (such as, 6400A Iron Oxide Red)
 prime color pigment (such as, 6320A Lamp Black)
 nut shell flour (such as, Pecan Shell Flour)

A particularly preferred basecoat useful for coating plastic surfaces proportionally contains the following:

| GALLONS | |  |
|---|---|---|
| 2.890 | Santicizer 160 | |
| 9.620 | Ind. Toluol | |
| 19.230 | Isobutyl Acetate | |
| 3.260 | High Vis. CV | |
| 13.209 | Acryloid B-66 (100%) | |
| 3.362 | Cab-381-0.1 | |
| 2.452 | Ti Pure R-902 | |
| 0.413 | MPA-60 Toluene | |
| 4.704 | Burgess #10 Pigment | |
| 2.178 | Minusil 10 | |
| 8.210 | N—Butyl | |
| 14.760 | Isopropanol, 99% UPA | |
| 12.700 | Lacquer Diluent | |
| 0.126 | Super-Adit | |
| 0.918 | Flatting Agent-OK-412 | |
| 1.970 | 6328A Iron Oxide Yellow | singly |
|  | 6400A Iron Oxide Red | or in |
|  | 6320A Lamp Black | mixtures |
| 2.326 | Pecan Shell Flour | |

In addition to the types of components described above in connection with the first and second preferred compositions described above, the above-described third composition contains pigments. Typical inorganic pigments useful for wood graining include those iron pigments ranging in color from yellow through red, reddish-brown, brown to black, similar to those found in natural wood. Such iron pigments include yellow ocher, raw and burnt sienna, and raw and burnt umber. Other useful inorganic color pigments include chrome yellow, cadmium sulfide, zinc yellow, cobalt blue, ultramarine blue, iron oxide, chrome green, chromium oxide green, chromium hydroxide green, lamp black carbon, and white pigments such as titanium dioxide, titanium calcium, zinc oxide, zinc sulfide, antimony oxide, lithopone, etc. Although lead pigments may be used, they are preferably avoided because of the safety hazard involved in their use. Organic pigments which may be used include toluidine red, phthalocyanine blue and green, Vandyke brown, alizarin, madder lake, lithol red, a pearl essence by itself or colored pearl essence, etc. Typical fillers include calcium carbonate, barium sulfate, china clay, talc, quartz silica, tripoli, mica, quarry dust, calcium sulfate, magnesium carbonate, magnesium oxide, aluminum hydrate, slate flour, Cab-O-Sil brand fumed silica, volcanic ash, pumice, flint, garnet, emery, aluminum oxide, silicon carbide, rotten stone, fine mesh South Dakota Stone, ground mica, microspheres such as glass, and the like, reinforcing fibers and pellets such as glass fiber, metal whiskers, fiberglass whiskers, crystal whiskers, asbestos filler, and the like. Fire retardant agents may also be included. Ultraviolet absorbers should be included in all coatings and usually are incorporated in the base resin as obtained from the supplier.

After applying the basecoat to the wood, it is dried, for example, in a conventional oven to remove the volatile solvents, thereby forming a hardened basecoat. An ink formulation may then be applied to the basecoat with a roller having a wood grain pattern.

After application of the graining ink formulation and air drying, the final wood product may be utilized as is, or stained with a conventional wood stain, then coated with a conventional varnish or other clear preservative.

The basecoat and ink formulation may be applied to any wood surface, including paper, if desired.

Having described the specific embodiments of the invention, other modifications and variations will be apparent to those of ordinary skill in the art, which variations and modifications are intended to be within the scope of the present invention.

I claim:

1. A basecoat formulation for forming a coating on wood or plastic surfaces, said coating capable of accepting a wood-colored stain, comprising, in parts by volume:

| | |
|---|---|
| water-miscible thickener | 0.179 part |
| dimethyl ethanol | 0.187 |
| defoamer | 0.227 |
| water dispersing resins | 0.837 |
| wetting agent | 0.847 |
| priming pigments | 2.960 |
| inert pigment | 3.393 |
| talc pigment | 10.464 |
| colloidal defoamer | 0.194 |
| fungicide | 0.129 |
| coalescer | 1.629 |
| acrylic emulsion | 41.333 |
| acrylic resin | 12.748 |
| pecan shell flour | 2.326 |
| water | 24.875 |

2. A basecoat formulation for forming a coating on plastic, said coating capable of accepting a wood-colored stain, comprising, in parts by volume:

| | |
|---|---|
| Component A: | 2.326 parts pecan shell flour in 6.00 parts sealer X |
| Component B: | 31.250 parts basecoat W |
| | 3.910 parts basecoat Y |
| | 56.510 parts sealer X | wherein
sealer X comprises, in parts by volume:

| | |
|---|---|
| toluol | 20.320 gals. |
| methyl amyl ketone | 7.007 gals. |
| methyl isobutyl ketone | 10.010 gals. |

| | |
|---|---|
| resins, vinyl | 11.630 lbs. |
| flatting agent | 1.682 lbs. |
| acetone | 10.611 gals. |
| resins | 10.711 gals. |
| plasticizer | 2.503 gals. |
| plasticizer solvent | 0.301 gals. |
| anti-settling agent | 5.005 gals. | basecoat W comprises:

| | |
|---|---|
| toluol | 4.01 gals. |
| resins | 8.002 gals. |
| wetting agents | 1.125 gals. |
| anti-settling agent | 0.48 gals. |
| white pigment | 230.069 lbs. |
| methyl ethyl ketone | 25.008 gals. |
| acetone | 15.805 gals. |
| lactol | 24.213 gals. |
| resins, vinyl | 74.022 lbs. |
| cellulose acetate butyrate resin | 54.016 lbs. |
| plasticizer | 3.001 gals. |
| flatting pigment | trace | and basecoat Y comprises:

| | |
|---|---|
| toluol | 4.01 gals. |
| resins | 8.002 gals. |
| wetting agents | 1.125 gals. |
| anti-settling agent | 0.48 gals. |
| yellow pigment | 210.0 lbs. |
| methyl ethyl ketone | 25.008 gals. |
| acetone | 15.805 gals. |
| lactol | 24.213 gals. |
| resins, vinyl | 74.022 lbs. |
| cellulose acetate butyrate resin | 54.016 lbs. |
| plasticizer | 3.001 gals. |
| flatting pigment | adjustable |

3. A weather-durable formulation for forming a coating on a wood or plastic surface, said surface, said coating capable of accepting a wood-colored stain, comprising, in parts by volume:

| | |
|---|---|
| plasticizer | 2.890 |
| toluol | 9.620 |
| isobutyl acetate | 19.230 |
| thickener | 3.260 |
| acrylic resin | 13.209 |
| flexibility agent | 3.362 |
| prime pigment | 2.452 |
| anti-settling agent | 0.413 |
| inert pigments | 6.882 |
| n-butanol | 8.210 |
| isopropanol (99%) | 14.760 |
| extender solvent | 12.70 |
| fungicide | 0.126 |
| yellow prime pigment | 1.970 (singly, |
| red prime pigment | or in |
| black prime pigment | mixtures) |
| pecan nut shell flour | 2.326 |

* * * * *